United States Patent Office 3,590,093
Patented June 29, 1971

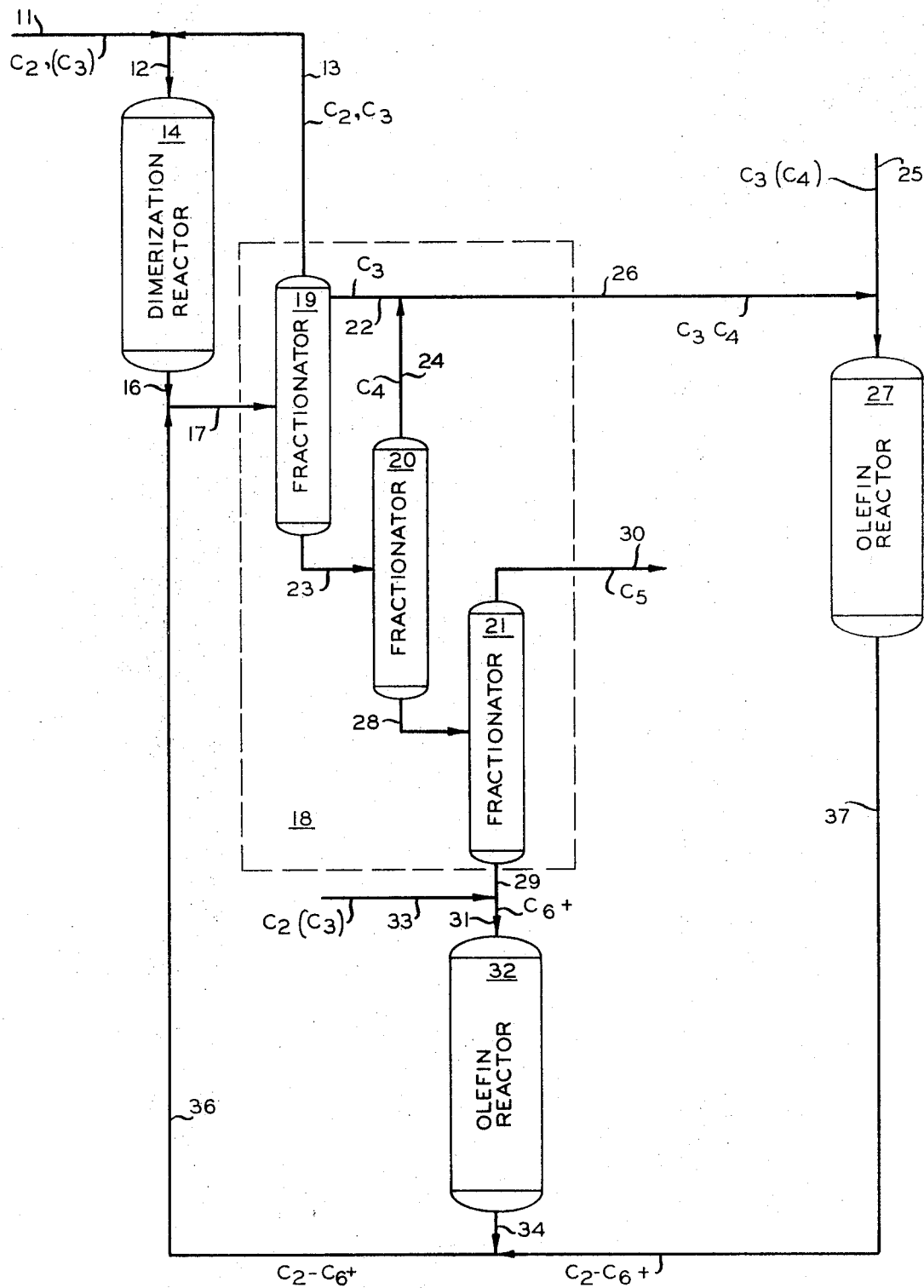

3,590,093
CONVERSION OF LOWER OLEFINS TO ISOAMYLENES
Donald L. Crain and Robert E. Reusser, both c/o Phillips Petroleum Co., Bartlesville, Okla. 74003
Filed Apr. 18, 1968, Ser. No. 722,260
Int. Cl. C07c 3/62
U.S. Cl. 260—683      5 Claims

ABSTRACT OF THE DISCLOSURE

Isoamylenes are produced from a feed stream comprising ethylene by codimerizing propylene and ethylene to produce isoamylene, feeding the effluent of the dimerization zone into a separation zone, feeding mixed butenes from the separation zone to an olefin reaction zone where they are reacted to produce additional isoamylenes, and feeding $C_6$ and heavier olefin hydrocarbons from the separation zone, along with ethylene or propylene, into an olefin reaction zone for production of lower molecular weight olefins which are recycled to the separation zone.

---

This invention relates to the production of isoamylenes from lower olefins. In one aspect, it relates to a process for the production of isoamylenes utilizing a co-dimerization of ethylene and propylene and the olefin reaction.

In many instances, it is desirable to convert an unbranched lower molecular weight acyclic olefin hydrocarbon to produce a branched higher molecular weight acyclic olefin hydrocarbon. For example, isoamylene, which is a valuable feed stock for the production of isoprene, is a desirable product to produce from relatively inexpensive and readily available feed stocks such as ethylene or a mixture of ethylene and propylene.

An object of the invention is to produce isoamylenes. Another object of the invention is to produce isoamylenes utilizing ethylene and propylene. Another object of the invention is to produce isoamylenes from ethylene.

According to the invention, ethylene and propylene, either from an outside source or recycle, are co-dimerized to produce isoamylenes followed by a separation from which separated ethylene and propylene are recycled to the dimerization zone, isobutene is converted in an olefin reaction zone to produce additional isoamylenes and $C_6$ and heavier hydrocarbons are converted in a second olefin reaction zone along with ethylene and/or propylene. Isoamylenes are recovered from the fractionation zone and the effluent from both olefin reaction zones are fed back to the separation zone.

The raw material to the dimerization zone can comprise ethylene or a mixture of ethylene and propylene, and ethylene and propylene are recycled to the dimerization zone from the separation zone. The mixed butenes from the separation zone are reacted together with additional butenes and/or propylenes in the first olefin reaction zone to produce additional isoamylenes. The mole ratio of isobutylene to n-butenes and propylene in this first olefin reaction zone is preferably at least about 1. The n-butenes, when present, should be predominantly butene-2. The $C_6$ and heavier olefins are reacted in the second olefin reaction zone along with ethylene or propylene which can be fed from an outside source or from a recycle stream.

In the first step, the ethylene-propylene mixture is co-dimerized over a suitable catalyst selected from among those known to have a catalytic effect for olefin dimerization, including, for example, silica, silica-alumina, acidized silica or silica-alumina, organic halide-treated silica or silica-alumina, supported phosphoric acid, $P_2O_5$, molybdic oxide, tungstic oxide, nickel oxide on silica or silica-alumina, etc.

The term "olefin reaction," as used herein, is defined as a process for the catalytic conversion over a catalyst of a feed comprising one or more ethylenically unsaturated compounds to produce a resulting product which contains at least 10 percent by weight of product compounds, which product compounds can be visualized as resulting from at least one primary reaction, as defined below, or the combination of at least one primary reaction and at least one unsaturated bond isomerization reaction, and wherein the sum of the compounds contained in said resulting product consisting of hydrogen, saturated compounds, and compounds which can be visualized as formed by skeletal isomerization but which cannot be visualized as formed by one or more of the above-noted reactions, comprises less than 25 percent by weight of the total of said resulting product. Feed components and unsaturated bond isomers thereof are not included in the resulting product for the purpose of determining the above-noted percentages.

In the olefin reaction, as defined above, the primary reaction is a reaction which can be visualized as comprising the breaking of two existing unsaturated bonds between first and second carbon atoms and between third and fourth carbon atoms, respectively, and the formation of the two new unsaturated bonds between said first and third and between said second and fourth carbon atoms. Said first and second carbon atoms and said third and fourth carbon atoms can be in the same or in different molecules.

The olefin reaction, as used in the present invention, is illustrated by the following reactions:

(1) The disproportionation of an acyclic mono- or polyene having at least 3 carbon atoms into other acyclic mono- or polyenes of both higher and lower number of carbonu atoms; for example the disproportionation of propylene yields ethylene and butenes; the disproportionation of 1,5- hexadiene yields ethylene and 1,5,9-decatriene;

(2) The conversion of an acyclic mono- or polyene having 3 or more carbon atoms and a different acyclic mono- or polyene having 3 or more carbon atoms to produce different acyclic olefins; for example, the conversion of butene-2 and isobutylene yields propylene and isopentene; and (3) The conversion of ethylene and an internal acyclic mono- or polyene having 4 or more carbon atoms to produce other olefins having a lower number of carbon atoms than that of the acyclic mono- or polyenes; for example, the conversion of ethylene and 4-methylpentene-2 yields propylene and 2-methylbutene-1.

The catalysts which are applicable in the present invention include all of those which have activity for the disproportionation of propylene to ethylene and butene. Some examples of such catalysts are:

(1) Silica or thoria promoted by an oxide or a compound convertible to the oxide by calcination of tungsten, molybdenum, rhenium vanadium, niobium, tellurium, or tantalum or by a sulfide of tungsten or molybdenum;

(2) Alumina promoted by an oxide or compound convertible to an oxide by calcination of molybdenum, tungsten, or rhenium; by a sulfide of tungsten or molybdenum; or by an alkali metal salt, ammonium salt, alkaline earth metal salt, or bismuth salt or phosphomolybdic acid;

(3) One or more of the group zirconia, aluminum phosphate, zirconium phosphate, calcium phosphate, magnesium phosphate, or titanium phosphate promoted by one or more of a sulfide of molybdenum or tungsten, or by an oxide or a compound convertible to an oxide by calcination of molybdenum, tungsten, vanadium, niobium, tantalum or rhenium or by magnesium tungstate or beryllium phosphotungstate;

(4) Silica, alumina, zirconia, aluminum phosphate, zirconium phosphate, calcium phosphate, magnesium phosphate, or titanium phosphate promoted by a hexacarbonyl or molybdenum or tungsten; and (5) Homogeneous olefin reaction catalysts where appropriate. In such embodiments, catalyst removal and/or recovery steps normally are required. For example, transition metal-containing homogeneous catalyst systems, active for the disproportionation of olefins, can be used. An example of one such catalyst system is bis(triphenylphosphine)dinitrosyldichloromolybdenum and methylaluminum sesquichloride which can be used at atmospheric pressure, room temperature, and preferably in the presence of a reaction diluent. Some suitable homogeneous catalyst systems are disclosed and claimed in U.S. Ser. Nos. 635,649 (now abandoned); 635,657 (now abandoned); 635,669 (now abandoned); 635,693 (now abandoned); 635,708, filed May 3, 1967; 694,872 (now abandoned); 694,873 (now abandoned); 694,874; filed Jan. 2, 1968; and 696,109 (now abandoned), filed Jan. 8, 1968.

The catalysts of (1) can be prepared and activated by conventional techniques such as by combining a catalyst grade silica with a suitable tungsten, molybdenum, rhenium, vanadium, niobium, tellurium, or tantalum compound by a conventional method such as, for example, impregnation, dry mixing or coprecipitation. Suitable tungsten and molybdenum compounds include tungsten oxide and molybdenum oxide and compounds convertible to the oxide, tungsten sulfide and molybdenum sulfide. The supported oxides and compounds convertible to the oxide are activated by calcining in air, and the supported sulfides are activated by heating in an inert atmosphere.

The catalysts of (2) can be prepared and activated by conventional techniques such as by combining catalyst grade alumina with an oxide or compound convertible to an oxide by calcination of molybdenum, tungsten or rhenium and calcining the resulting mixture after removal of any solvent used in the impregnation. The sulfides of tungsten or molybdenum or the salts of phosphomolybdic acid can be utilized to impregnate a catalyst grade alumina by solution in a proper solvent after which the solvent is evaporated and the resulting mixture dried to prepare the catalyst.

The catalyst compositions of (3) can be prepared and activated by conventional techniques. For example, molybdenum oxide can be coprecipitated with aluminum phosphate, followed by calcination in air to produce an activated catalyst. Alternatively, the support material, such as zirconia, can be impregnated with a compound of the promoter convertible to the oxide, such as ammonium tungstate, followed by calcination in air. In the preparation of a sulfide-containing catalyst, a sulfide of the promoter can be ball milled with a support such as zirconium phosphate, followed by heating in an inert atmosphere such as nitrogen. Magnesium tungstate and beryllium phosphotungstate can be dry mixed with titanium phosphate, for example, and activated by calcination in air at elevated temperatures.

The catalyst compositions of (4) can be prepared and activated by impregnating a previously calcined support material such as calcium phosphate with a solution of the hexacarbonyl of the promoter in an organic solvent such as benzene, followed by drying in a vacuum or in an inert atmosphere at about 50 to 700° F.

The catalyst compositions of (5) can be prepared by simple combination of the transition metal compound with a suitable adjuvant such as, for example, an organoaluminum halide, under conditions suitable to provide a catalyst active for the olefin reaction.

The solid catalytic agent is considered to be the reaction product resulting from the admixture of the support material and the promoter material and any subsequent activation treatment.

The operating temperature for the olefin reaction is generally in the range of about 0 to 1200° F. When using the catalysts of (1), it is in the range of about 400 to about 1100° F.; when using the catalysts of (2), in the range of about 150 to 500° F.; when using the catalysts of (3), in the range of about 600 to 1200° F.; when using the catalysts of (4), in the range of about 0 to 600° F.; when using the catalysts of (5), in the range of about −20 to 170° F. In the olefin reaction process, generally the pressure is not critical except with respect to the state of the materials in the reaction zone and with respect to conditions up and downstream from the reaction zone, but generally the pressure is in the range of 0 to 2000 p.s.i.g.

The solid catalysts of the olefin reaction can be in the form of a powder, or granules, as well as in other shapes such as agglomerates, pellets, spheres, extrudates, beads, and other forms depending upon the type of contacting technique utilized.

With a fixed bed reactor and continuous operation, weight hourly space velocity in the range of about 0.5 to 1000 parts by weight of hydrocarbon feed per part by weight of catalyst per hour (WHSV) are suitable, and excellent results have been obtained in the range of 1 to 200 WHSV.

It is frequently advantageous to associate double bond isomerization with the olefin reaction. This can be done by providing a combined catalyst system which contains both an olefin reaction catalyst and a double bond isomerization catalyst. In one such system, the olefin feed sequentially contacts an isomerization catalyst and an olefin reaction catalyst. In another such system, the feed contacts a compatible mixture of such catalysts. A convenient combined catalyst system of this type is a fixed bed system containing an intimate physical mixture of a particulate olefin reaction catalyst and a particulate isomerization catalyst. When air activated refractory oxide olefin reaction catalysts are used, metal oxide isomerization catalysts such as MgO, ZnO, etc., are particularly appropriate.

Depending upon the specific feed materials and the specific catalysts being used, any conventional contacting technique can be utilized, such as fixed bed reaction, fluidized bed reaction, liquid phase batch reaction, and the like.

At the completion of the reaction, the reaction mixture can be processed to recover any desired product by any conventional means such as fractionation, crystallization, absorption, and the like. Unreacted material or products not in the desired melecular weight range can be recycled.

As shown is the drawings, a propylene-ethylene stream is contacted with a dimerization catalyst, thus producing branched pentenes, branched hexenes and other oligomers of propylene and ethylene. After removal of the lower molecular weight olefin products by appropriate separation means, the $C_6+$ olefins are conducted to an olefin reaction unit along with ethylene in proportions ranging generally from about 1 to about 20, preferably 4 to about 10 moles of ethylene per mole of oligomer. The ethylene can be a feed stream as well as some recycle material generated in other catalytic stages. If desired, the ethylene stream can be replaced with a propylene stream or with a mixed ethylene-propylene stream. The effluent from this olefin reaction zone contains a substantial amount of isobutenes as well as said higher and lower molecular weight olefins which are recycled to appropriate stages of the process.

The isobutene from the preceding olefin reaction is combined with normal butene and/or propylene and then conducted to another olefin reaction unit. The effluent from this olefin reaction unit contains a substantial amount of isoamylenes which are recovered in the second separation stages. Other components of the effluent, such as ethylene, propylene, isobutene, isohexene and heavier olefins, are recycled to the appropriate other units. The operating conditions for each of the catalytic reactions will depend upon the specific catalyst utilized and the relative proportion of olefins at each step.

The specific product distribution has an effect on the consumption of the various feeds. For example, the specific distribution can be selected to result in using only a small amount of propylene. On the other hand, increased consumption of propylene can be realized by increasing the ratio of propylene to ethylene fed to the dimerization unit. Also, using a catalyst and conditions which lead to production of more highly branched products tends to increase propylene consumption. Thus, the process can be adjusted to fit a wide range of available ethylene and propylene and butene feed streams.

In the drawing, a feed stream enters through pipe 11 and passes through pipe 12, along with recycled ethylene and propylene from pipe 13, into dimerization reactor 14. The effluent from reactor 14 passes through pipe 16 and pipe 17 into separation zone 18. A separation zone 18 comprises three fractionators, fractionators 19, 20 and 21. From fractionator 19, recycle ethylene and propylene are returned to pipe 13, as shown. A portion of the propylene can be fed through pipe 22 into subsequent reactor 27, if desired. Heavier olefins are fed through pipe 23 into fractionator 20. Butenes are removed overhead from fractionator 20 through pipe 24 and fed, along with any propylene from pipe 22, through pipe 26 to olefin reactor 27. Propylene and/or butene can be fed through pipe 25 as desired. Olefins heavier than butenes are fed through pipe 28 into fractionator 21. A $C_5$ fraction is removed overhead through pipe 30 as the product while the remainder of the stream, that is, hexenes and any heavier olefins, are passed through pipe 29 and pipe 31 into olefin reactor 21, along with a stream comprising ethylene and/or propylene in pipe 33. The effluent from reactor 32 is passed through pipe 34 and pipe 36 to pipe 17 and fractionator 19. The effluent from olefin reactor 27 similarly is passed through pipe 37, pipe 36 and pipe 17 to fractionator 19.

In an example according to the invention, the catalyst in reactor 14 comprises $P_2O_5$ supported on kieselguhr, the temperature is 400° F., the pressure 400 p.s.i.g. and the space velocity is 10 pounds of reactant per pound of catalyst per hour (WHSV). In olefin reactor 27 is tungsten oxide supported on silica, the temperature is 800° F.; the pressure 400 p.s.i.g., and the space velocity is 50 WMSV. In reactor 32, the catalyst is a mixture of magnesium oxide and tungsten oxide supported on silica, the temperature is 700° F., the pressure 400 p.s.i.g., and the space velocity is 50 WHSV. In the table below, the amounts of the various products in the streams illustrated in the drawing are shown. The numbers on the columns correspond with the type numbers in the drawing.

In the practice of the invention, although there are no significant by-products, a small amount of paraffinic materials can be formed and these can be removed at any convenient point in the process, together with any paraffinic materials included in the feed stock. It is also some times advantageous to feed to the olefin reaction zone feed streams which have been deoiled, that is, which have had any materials heavier than the feed removed, for example, by distillation. In this way, the accumulation or carry-over of small amounts of materials which may poison or shorten the life of the catalyst is avoided.

The illustrations of the invention in the drawing and the description in the specification are, of course, simplified. Many elements required in commercial operation have been eliminated, including, for example, valves, controls, etc. Any suitable separation apparatus, including larger or smaller numbers of separation vessels, different types of separation, etc., can be included within the separation zone.

Because of difficulty of separation, the isoamylenes product of the invention process will contain relatively small amounts of n-amylenes. These can be removed, if desired, by a further sequence of separations. However, the product is entirely suitable for dehydrogenation to isoprene without additional purification.

TABLE

| Pounds | 11 | 12 | 13 | 16 | 17 | 22 | 23 | 24 | 25 | 26 | 28 | 29 | 30 | 31 | 33 | 34 | 36 | 37 | Products | Feeds |
|---|---|---|---|---|---|---|---|---|---|---|---|---|---|---|---|---|---|---|---|---|
| $C_2=$ | 0.1910 | 1.0000 | 0.8090 | 0.2000 | 0.8090 | | | | | | | | | | | 0.3804 | 0.6090 | 0.2186 | | 1.4924 |
| $C_3=$ | | 1.0000 | 1.0000 | 0.2000 | 1.6120 | 0.6120 | | | 0.0385 | 0.6505 | | | | 1.3014 | 1.3014 | 1.0535 | 1.4120 | 0.3585 | | 0.0385 |
| n-$C_4=$ | | | | 0.0800 | 0.3445 | | 0.3445 | 0.3445 | | 0.3445 | | | | | | 0.0972 | 0.2645 | 0.1673 | | |
| i-$C_4=$ | | | | 0.0800 | 1.5566 | | 1.5566 | 1.5566 | | 1.5566 | | | | | | 0.7166 | 1.5566 | 0.8400 | | |
| n-$C_5=$ | | | | | 0.1082 | | 0.1082 | | | | 0.1082 | | 0.1082 | | | 0.0153 | 0.0282 | 0.0129 | 0.1082 | |
| i-$C_5=$ | | | | 0.4800 | 1.4227 | | 1.4227 | | | | 1.4227 | | 1.4227 | | | 0.2429 | 0.9427 | 0.6998 | 1.4227 | |
| $C_6=+$ | | | | 0.9600 | 1.7350 | | 1.7350 | | | | 1.7350 | 1.7350 | | 1.7350 | | 0.5205 | 0.7750 | 0.2545 | | |
| Total | 0.1910 | 2.0000 | 1.8090 | 2.0000 | 7.5880 | 0.6120 | 5.1660 | 1.9011 | 0.0385 | 2.5516 | 3.2659 | 1.7350 | 1.5309 | 3.0364 | 1.3014 | 3.0364 | 5.5880 | 2.5516 | 1.5309 | 1.5309 |

We claim:
1. A process for converting ethylene to produce isoamylene, comprising the steps of:
   dimerizing propylene and said ethylene in a dimerization zone to produce isoamylene;
   feeding the effluent of said dimerization zone into a separation zone;
   separating said effluent to produce a first separated stream comprising propylene, a second separated stream comprising isobutene and n-butene, a third separated stream comprising isoamylene, and a fourth separated stream comprising hexene;
   returning said first separated stream comprising propylene from said separation zone to said dimerization zone;
   feeding said second separated stream comprising isobutene and n-butene into a first olefin reaction zone and converting therein according to the olefin reaction which, as defined herein, can be visualized as comprising the reaction between two first pairs of carbon atoms, the two carbon atoms of each first pair being connected by an olefinic double bond, to form two new pairs from the carbon atoms of said first pairs, the two carbon atoms of each of said new pairs being connected by an olefinic double bond, to produce isoamylene;
   removing said third separated stream comprising isoamylene from said separation zone;
   feeding said fourth separated stream comprising hexene from said separation zone into a second olefin reaction zone;
   feeding an olefin selected from ethylene and propylene into said second olefin reaction zone; and
   feeding the effluent from said second olefin reaction zone into said separation zone.

2. The process of claim 1 wherein said propylene which is dimerized in said dimerization zone is substantially all returned in said first separated stream from said separation zone.

3. The process of claim 1 wherein propylene is fed into said first olefin reaction zone.

4. The process of claim 1 wherein additional butene is fed into said first olefin reaction zone.

5. The process of claim 2 wherein propylene is fed into said first olefin reaction zone and ethylene is fed into said second olefin reaction zone.

References Cited
UNITED STATES PATENTS

| | | | |
|---|---|---|---|
| 2,102,073 | 12/1937 | Ipatieff et al. | 260—683.15 |
| 3,261,879 | 7/1966 | Banks | 260—683 |
| 3,457,320 | 7/1969 | Stapp et al. | 260—683 |

PAUL M. COUGHLAN, JR., Primary Examiner

C. E. SPRESSER, JR., Assistant Examiner

U.S. Cl. X.R.

260—683.15